Patented Oct. 14, 1924.

1,511,856

UNITED STATES PATENT OFFICE.

HARLEY F. WILSON AND WILLIAM A. HADFIELD, OF MADISON, WISCONSIN, ASSIGNORS TO GENERAL LABORATORIES, OF MADISON, WISCONSIN, A CORPORATION OF ARIZONA.

STERILIZING BEE FOODS, ETC.

No Drawing. Application filed November 24, 1922. Serial No. 603,117.

*To all whom it may concern:*

Be it known that we, HARLEY F. WILSON and WILLIAM A. HADFIELD, citizens of the United States, residing at Madison, in the county of Dane and State of Wisconsin, have invented new and useful Improvements in Sterilizing Bee Foods, Etc., of which the following is a specification.

In accordance with the present invention a preparation for the internal administration of a sterilizing material is prepared by incorporating a soluble hypochlorite, such as sodium hypochlorite, in a solution of carbohydrates in the presence of free alkali at least slightly in excess of the amount necessary for the neutralization of acid oxidation products formed in the solution. The solution of carbohydrates may suitably be simple syrup, glucose or maltose syrup or the like. Honey, preferably diluted to any desired extent, has been found a very desirable carbohydrate material for use in accordance with this invention.

In preparing the sterilizing material the carbohydrate solution is mixed with at least 2% of a solution containing 3% of a soluble hypochlorite, such as sodium hypochlorite and at least an equal amount of free alkali, preferably as sodium carbonate. For example, a honey syrup may be prepared by diluting honey with an equal volume of water and adding to the mixture 4% of a solution containing 3% of sodium hypochlorite and 8 to 9% of sodium carbonate.

The sterile material thus prepared is particularly suitable for use in feeding bees exposed to infection from such diseases as American and European foul brood. In such cases the infection is frequently caused by the adult bees, which are immune, carrying infected honey in their honey sacs and feeding it to the larvæ or storing it for subsequent feeding. The spores of the bacilli causing American foul brood are especially resistant and virulent when developed. In such case the honey employed in preparing the material may suitably be honey from infected hives, as the spores are completely destroyed and the honey sterilized by the hypochlorite.

The presence of the free alkali is of great importance in destroying the harsh and irritating tastes and odors developed in the treated carbohydrate solution. Thus, in the treatment of honey fed to bees in the manner above described, it is found that if no free alkali is included, the bees are inclined not to feed on the treated material.

We claim:

1. The method of preparing hypochlorites for administration which consists in admixing a soluble hypochlorite with a carbohydrate solution in the presence of sufficient free alkali to neutralize oxidation products.

2. The method of preparing hypochlorites for administration which consists in admixing with a carbohydrate solution at least 2% of a 3% sodium hypochlorite solution containing free alkali sufficient to neutralize oxidation products.

3. The method of preparing hypochlorites for administration which consists in admixing with a carbohydrate solution at least 2% of a solution containing 3% sodium hypochlorite and 8–9% sodium carbonate.

4. The method of preparing foul-brood infected honey for administration to bees which consists in admixing therewith sodium hypochlorite and at least sufficient free alkali to neutralize oxidation products.

5. The method of preparing foul-brood infected honey for administration to bees which consists in diluting the honey with water and admixing therewith at least 2% of a 3% sodium hypochlorite solution and sufficient free alkali to neutralize oxidation products.

6. The method of preparing foul-brood infected honey for administration to bees which consists in diluting the honey with an equal volume of water and adding thereto 4% of a solution containing 3% of sodium hypochlorite and 8 to 9% of sodium carbonate.

7. A composition of matter consisting of a carbohydrate syrup, a soluble hypochlorite and excess free alkali.

8. A composition of matter consisting of a honey syrup, sodium hypochlorite and excess sodium carbonate.

HARLEY F. WILSON.
WILLIAM A. HADFIELD.